United States Patent
Andersson

(10) Patent No.: US 7,961,913 B2
(45) Date of Patent: Jun. 14, 2011

(54) PORTABLE DATA CARRIER, EXTERNAL ARRANGEMENT, SYSTEM AND METHODS FOR WIRELESS DATA TRANSFER

(75) Inventor: Jonas Andersson, Höllviken (SE)

(73) Assignee: Precise Biometrics AB, Lund (SE)

( * ) Notice: Subject to any disclaimer, the term of this patent is extended or adjusted under 35 U.S.C. 154(b) by 1217 days.

(21) Appl. No.: 10/588,768

(22) PCT Filed: Feb. 7, 2005

(86) PCT No.: PCT/SE2005/000141
§ 371 (c)(1),
(2), (4) Date: Oct. 6, 2006

(87) PCT Pub. No.: WO2005/078647
PCT Pub. Date: Aug. 25, 2005

(65) Prior Publication Data
US 2007/0133846 A1    Jun. 14, 2007

Related U.S. Application Data

(60) Provisional application No. 60/543,545, filed on Feb. 12, 2004.

(30) Foreign Application Priority Data

Feb. 12, 2004 (SE) ...................... 0400308

(51) Int. Cl.
*G06K 9/00* (2006.01)
(52) U.S. Cl. ......... 382/115; 382/305; 713/169; 713/186
(58) Field of Classification Search .................. 382/118, 382/124, 125; 45/41, 411; 713/186, 202
See application file for complete search history.

(56) References Cited

U.S. PATENT DOCUMENTS 5,144,680 A    9/1992    Kobayashi et al.
(Continued)

FOREIGN PATENT DOCUMENTS

JP    08-221570 A    8/1996
(Continued)

OTHER PUBLICATIONS

Information technology—Security techniques—Entity authentication, Part 2: Mechanisms using symmetric encipherment algorithms, ISO/IEC, 9798-2, Second Edition, (Jul. 15, 1999).

*Primary Examiner* — Gregory M Desire
(74) *Attorney, Agent, or Firm* — Birch, Stewart, Kolasch & Birch, LLP

(57) ABSTRACT

A portable data carrier (10) and a method (B1-B10), as well as a storage medium with instructions, for transferring data by means of a portable data carrier are provided. The portable data carrier comprises a carrier storage (12) for storing data containing a biometric template (13) and an application-specific function (15) as well as carrier communication means (11) for contactless receipt and transmission of data. The portable data carrier is characterised in that it further comprises carrier processing means (16) for comparing the biometric template with a biometric sample (23) received from an external arrangement (20), and that it is arranged to complete a handshake process with the external arrangement as well as perform the application-specific function and transmit a result of the same to the external arrangement, only if the biometric sample matches the biometric template.

48 Claims, 3 Drawing Sheets

U.S. PATENT DOCUMENTS

| | | | |
|---|---|---|---|
| 5,484,997 | A | 1/1996 | Haynes |
| 6,111,506 | A | 8/2000 | Yap et al. |
| 6,354,493 | B1 | 3/2002 | Mon |
| 6,948,066 | B2 * | 9/2005 | Hind et al. ............... 713/168 |
| 2002/0095586 | A1 * | 7/2002 | Doyle et al. ............... 713/186 |
| 2002/0095587 | A1 * | 7/2002 | Doyle et al. ............... 713/186 |
| 2002/0123325 | A1 * | 9/2002 | Cooper ........................ 455/411 |
| 2002/0174336 | A1 | 11/2002 | Sakakibara et al. |
| 2003/0226041 | A1 * | 12/2003 | Palmer et al. ............... 713/202 |
| 2004/0002902 | A1 * | 1/2004 | Muehlhaeuser ............ 705/26 |
| 2004/0123113 | A1 * | 6/2004 | Mathiassen et al. ........ 713/185 |
| 2004/0133787 | A1 * | 7/2004 | Doughty et al. ............ 713/186 |
| 2005/0144464 | A1 * | 6/2005 | Chiu et al. .................. 713/186 |
| 2009/0010503 | A1 * | 1/2009 | Mathiassen et al. ........ 382/125 |

FOREIGN PATENT DOCUMENTS

| | | |
|---|---|---|
| JP | 2000-132658 A | 5/2000 |
| JP | 2001-283162 A | 10/2001 |
| JP | 2002-304448 A | 10/2002 |
| JP | 2003-296668 A | 10/2003 |
| WO | WO-98/01820 A1 | 1/1998 |
| WO | WO-00/74001 A1 | 12/2000 |
| WO | WO-01/06445 A1 | 1/2001 |
| WO | WO-01/11577 A1 | 2/2001 |
| WO | WO-01/84494 A1 | 11/2001 |
| WO | WO-02/056553 A2 | 7/2002 |
| WO | WO 02/086808 A1 | 10/2002 |
| WO | WO-03/003286 A1 | 1/2003 |

* cited by examiner

PORTABLE DATA CARRIER, EXTERNAL ARRANGEMENT, SYSTEM AND METHODS FOR WIRELESS DATA TRANSFER

This National Phase PCT application claims priority under 35 U.S.C. 119(e) on U.S. Provisional Application No(s). 60/543,545 filed on Feb. 12, 2004 and under 35 U.S.C. 119(a) on Patent Application No(s). 0400308-3 filed in Sweden on Feb. 12, 2004, all of which are hereby incorporated by reference.

FIELD OF THE INVENTION

The present invention relates to a portable data carrier, which comprises a carrier storage for storing data containing a biometric template and an application-specific function as well as carrier communication means for contactless receipt and transmission of data. The invention further relates to a method, and a storage medium with instructions, for transfer of data by means of a portable data carrier as stated above.

The present invention also relates to an external arrangement comprising arrangement communication means for contactless receipt and transmission of data, and a sensor for recording a biometric sample. Moreover the invention relates to a method, and a storage medium with instructions, for transfer of data by means of an external arrangement as stated above.

The present invention further relates to a system for transfer of data, comprising a portable data carrier and an external arrangement as stated above. Moreover the invention relates to a method of transferring data comprising a method of transferring data by means of a portable data carrier and a method of transferring data by means of an external arrangement as stated above.

BACKGROUND ART

Access to information, to a room or the like must in many cases be limited to certain individuals. This may be the case, for example, when electronic money transactions are to be done on the Internet, when in a hospital the access to records is to be limited, or when only certain individuals in a workplace are allowed to have access to certain information or certain rooms. In these contexts portable data carriers are frequently used, for instance intelligent cards or smart cards. A smart card can be described as a card the size of a credit card with an integrated processor or a signal processing means, a storage and a communication interface.

Sensitive information is stored on all smart cards that are used in the above cases. Such sensitive information contains at least a so-called template, which can be described as pre-stored reference information about the card user. In each attempted use, the card user's right to use the card is verified by this template. Depending on the context in which a smart card is intended to be used, other sensible information may also be stored in the card storage.

The template above may correspond to, for instance, a PIN code (PIN=Personal Identification Number). When the card holder wants to verify his/her right to use the card, he/she places it in a terminal and enters a PIN code. The card holder's card user right is verified if the PIN code entered corresponds to the template stored in the storage. According to another example, the above template can be biometric, i.e. correspond to body-related, individual-specific information, such as the pattern of a user's fingers, palm, iris or the user's voice. A method where a card holder or card user identifies himself by biometric information according to prior art typically proceeds as follows:

The user places his smart card in a terminal and a finger on a sensor which generates a digital image, i.e. a digital representation, of the finger. The digital image of the finger then proceeds to an external processor, for instance a personal computer, where it is preprocessed. In preprocessing, the information quantity in the image is reduced so that, for instance, a binarised image or parts of a binarised image is/are generated. A corresponding preprocessed image is stored on the card as a template. The external processor retrieves the template from the card and compares this with the preprocessed image of the finger. The card holder's card user right is verified if the image matches the template.

When using the portable data carriers described above, a user must arrange them in physical contact with a terminal for them to be able to communicate with the same. This means that under normal circumstances the user of such a portable data carrier thus is always aware of when his/her data carrier communicates with the terminal. The physical contact between terminal and data carrier that is required for communication is, however, sometimes a source of problems, inter alia because of the risk of a loose contact, corrosion on the contact surfaces etc. To solve these problems, it is known to use wireless communication between a portable data carrier and a terminal.

U.S. Pat. No. 6,111,506 discloses, for example, a system where a card-shaped data carrier in the form of a personal identification document communicates wirelessly with a terminal. When the identification document receives a signal from the terminal, it checks whether the terminal is entitled to communicate with the identification document. If this is the case, the terminal is allowed to read data from the identification document. The data read can be biometric data which represent, for example, a fingerprint of the holder of the identification document. In a biometric identification check, the individual showing the identification document is asked to interact with a device, connected to the terminal, for recording of biometric data. In a computer connected to the terminal, said biometric data read from the identification document are then compared with said recorded biometric data. If there is a match between them, it is verified that the individual showing the identification document is the rightful holder of the same. In the case involving this system, the identification document is thus activated to be read by the terminal as soon as it has been established that the terminal is entitled to communicate with the identification document. This means that the data of the identification document are open for reading independently of whether it is the rightful holder of the identification document who shows the same or someone who, for instance, has stolen the identification document. The construction of the system above further causes the problem that communication with the data carrier without its carrier's knowledge is made possible. A terminal in wrong hands may be arranged in secret, for instance, in the vicinity of, for example, a bag or a pocket containing the data carrier and from there read data stored in, or in other ways interact with, the data carrier. This results in a great problem in many situations. One example is if the identification document is a passport and the holder of the passport for some reason does not want to reveal his nationality or other information stored in the passport. The holder of the passport may even want to keep the mere possession of the passport secret. The latter reasoning may also be applied in connection with identification documents in the form of membership cards for different organisations, when it is desirable to keep the membership secret. Finally, if a system corresponding to that stated above should be applied in connection with a data carrier in the form of a bank card, this could mean that someone with a portable terminal could relatively easily steal money directly from the account connected with the bank card.

U.S. Pat. No. 5,484,997 discloses a system, in which a card-shaped data carrier in the form of an identity card communicates wirelessly with a terminal. The identity card is activated to automatically transmit data stored in the same when photocells on the identity card are irradiated. If the identity card is not protected, for example in a wallet or purse when it is not intended to be used, it can thus in an undesirable way transmit data to terminals in the neighbourhood. Moreover sufficient irradiation must be available when using the data carrier to make it function. There is thus a risk that the data carrier cannot be used if it is not arranged in a certain way in relation to the source of radiation, or if the user by mistake puts his fingers over the photocells. Finally, it is difficult to manufacture a durable and practically designed data carrier of the above-mentioned type.

SUMMARY OF THE INVENTION

The object of the present invention is to wholly or partly eliminate the problems associated with prior-art technique.

This object is achieved by a portable data carrier, a method, and a storage medium with instructions, for transferring data by means of a portable data carrier, an external arrangement, a method, and a storage medium with instructions, for transferring data by means of an external arrangement, and a system and a method for transferring data according to the independent claims. Embodiments of the invention are defined in the dependent claims.

A basic idea of the present invention is to prevent sensitive data stored in a portable data carrier from being read without its carrier's knowledge and consent. A further basic idea of the present invention is to prevent sensitive data stored in a portable data carrier from being read without its rightful owner's knowledge and consent. Summing up, the object of the present invention is among other things to prevent sensitive data stored in a portable data carrier from being read without a check being made that the person carrying the portable data carrier is the rightful owner of the same and that this owner has consented to reading.

According to a first aspect, the invention relates more specifically to a portable data carrier, which comprises a carrier storage for storing data containing a biometric template and an application-specific function as well as carrier communication means for contactless receipt and transmission of data. The portable data carrier is characterised in that it further comprises carrier processing means for comparing the biometric template with a biometric sample received from an external arrangement, and that it is arranged to complete a handshake process with the external arrangement as well as perform the application-specific function and transmit a result of the same to the external arrangement, only if the biometric sample matches the biometric template.

By data carrier is meant a number of different units, both passive and active, such as smart cards, electronic passports, electronic visa and tickets, RF tags, mobile phones, PDAs (Personal Digital Assistants) etc. The term passive data carrier relates to a data carrier that does not have its own power supply and thus is dependent on an outer power source to be able to operate. The term active data carrier relates to the opposite, i.e. a data carrier having its own power supply. The choice between a passive and an active data carrier is made according to the application in which the data carrier is intended to be used. The terms biometric template and biometric sample relate to individual-specific data, i.e. data that are unique to each individual. Some examples of such data can be the pattern of the individual's fingers, palm, iris, or the individual's face, voice or DNA. The template relates to reference data which are stored on the data carrier and are normally not changed after the original storing. The sample relates to data that must be presented by an individual each time he wants to use the portable data carrier.

The fact that the portable data carrier comprises carrier communication means for contactless transfer of data means that the contact problems associated with prior art are eliminated, for instance problems like the contact surfaces being destroyed or worn out. The contactless transfer also means that the portable data carrier does not have to be arranged in direct connection with the external arrangement for communication to take place between them. Theoretically seen, a user does not even have to take his data carrier out of, for instance, the pocket or bag in communication with the external arrangement. This can be practical in the case that the user carries other objects in his hands, such as air tickets or suitcases. It is also practical from the viewpoint that the user in this way does not have to search for the data carrier, for instance, in his bag and also does not risk losing the data carrier.

The fact that the portable data carrier comprises carrier processing means for comparing the biometric template with the biometric sample that is received from the external arrangement means that the biometric template does not have to leave the data carrier in this biometric comparison, which is positive from a security point of view.

The feature that the portable data carrier is arranged to perform the application-specific function and transmit a result of the same to the external arrangement only on condition that the biometric sample matches the biometric template, means that any sensitive information is protected from the environment until it has been verified that the individual carrying the portable data carrier actually is the rightful owner of the same.

By matching is meant in this context that the biometric sample corresponds to the biometric template to a sufficient degree for the individual carrying the portable data carrier to be considered to be the same as the rightful owner of the data carrier.

The term application-specific function relates to a set of instructions according to which the data carrier is arranged to operate under certain circumstances. The composition of these instructions is dependent on the application in which the portable data carrier is intended to be used.

The application-specific function in the data carrier may comprise the instruction to retrieve from the carrier storage application-specific information stored therein, the result transmitted to the external arrangement containing the application-specific information. The composition of the application-specific information is dependent on the application in which the portable data carrier is intended to be used. For instance, it can be information that is stored on the actual data carrier in the form of data files, a "key" allowing the data carrier to be used, for instance, to open a door to a room and give the user access to information of a type different from what can be stored on the actual data carrier, or different types of so-called digital certificates. In the case that the data carrier, for instance, is intended to be used as an electronic passport, the application-specific information may contain such information as can be included in traditional passports, for instance information that identifies the holder of the electronic passport.

The application-specific function in the data carrier can also/alternatively comprise the instruction to execute program code that is stored in the carrier storage. Execution of this program code makes it possible for the data carrier to provide functionality of different kinds, such as encryption, signing, verification, evaluation etc. In the case that the data carrier is a mobile phone with bank card functionality, execution of the program code may result in signing a money transaction, said signing being included in the result transmitted to the external arrangement.

The portable data carrier can be arranged to perform the application-specific function and transmit said result of the same to the external arrangement in response to an enquiry received from the external arrangement. Such an enquiry may imply that the external arrangement asks the portable data carrier to transmit information and/or perform said function based on certain parameters.

The biometric template can correspond to a digital image, i.e. a recording in digital form, containing individual-specific information as stated above. The advantage of using digital representations is that they can be easily and quickly recorded and they are easy to process in various ways.

The biometric template can define at least part of a fingerprint, which part preferably has a particularly interesting information content corresponding to, for example, interesting points of intersection between lines in the fingerprint. The advantage of using fingerprints for biometric identification is, among other things, that a fingerprint from one and same individual under normal circumstances is permanent. Moreover fingerprints are easy to record by conventional sensors.

The biometric template can correspond to feature reference data which describe, for instance, the most distinguishing features of a fingerprint from the owner of the portable data carrier. In this embodiment, less information can be compared to establish whether a biometric match exists or not than in the case where the biometric template corresponds to the entire fingerprint.

The biometric template can also correspond to a combination of the above alternatives, for instance a combination of an image of at least part of a fingerprint and feature reference data of the fingerprint.

The portable data carrier can be arranged to store in the carrier storage a threshold value which defines to what degree the biometric sample should correspond to the biometric template for a match to be considered to exist. In this case, the data carrier is arranged to determine, by said carrier processing means, a value of the match between the biometric sample and the biometric template and then compare this value with the threshold value. If the value of the match exceeds the threshold value, a match according to the above definition is considered to exist and vice versa. The threshold value can be selected and adjusted to the application in which the portable data carrier is intended to be used. If the data carrier, for instance, is an electronic passport, a higher threshold value can be selected than in the case where the data carrier is a simpler "key card", which can be used, for instance, to generate a consent to or denial of physical access to a room.

The portable data carrier can be an electronic passport intended to replace the traditional passports. In one embodiment, such an electronic passport may consist of an ordinary passport provided with a computer chip capable of storing, transferring and processing data. Such an embodiment would imply that the ordinary passports do not have to be discarded but can be adjusted to the new technique by being supplemented with a chip as described above. An electronic passport according to the invention may, of course, be designed in various other ways without deviating from the scope of the invention as defined by the appended claims.

An electronic passport according to the present invention makes the examination of passports easier as well as safer. Instead of a passport official having to manually examine the passport by comparing the individual showing the passport with the individual shown in the image in the passport, which can be a difficult, time-consuming and failure-prone task, only a recording of a biometric sample has to be made, which results in an answer whether an individual actually is who he/she pretends to be.

As stated above, the biometric template does not have to leave the portable data carrier for a comparison with a biometric sample to be able to be made. The portable data carrier can be arranged to completely prevent external access to the biometric template.

The portable data carrier can be arranged to communicate with the external arrangement only for a predetermined time after a match was considered to exist. After the predetermined time has elapsed, the data carrier is then arranged to interrupt the communication with the external arrangement. This predetermined time is preferably exactly so long as to allow the result of the performance of the application-specific function to be transferred. Such an automatic interruption of the communication link between the external arrangement and the data carrier increases safety against unauthorised reading of sensitive information from the data carrier.

A portable data carrier according to the invention can be arranged to transmit a presence signal in response to a search signal received from the external arrangement to confirm its presence within a communication range of the external arrangement. The advantages of such an embodiment will be discussed below in connection with the external arrangement according to the invention.

A portable data carrier according to the invention can instead be arranged to prevent all transmission of data from the same until a match is considered to exist. The advantage of such an embodiment is that an individual does not reveal his possession of a portable data carrier according to the invention contrary to his will. The individual must actively give his consent to revealing his possession of a data carrier by providing a biometric sample. The biometric sample is then transmitted to all portable data carriers according to the invention which are positioned within a communication range of the external arrangement where the sample was provided. Only one portable data carrier containing a matching biometric template can then reveal its existence.

According to a second aspect, the present invention relates to a method of transferring data by means of a portable data carrier which comprises a carrier storage for storing of data containing a biometric template and an application-specific function as well as carrier communication means for contactless receipt and transmission of data. The method is characterised in that it further comprises receiving a biometric sample from an external arrangement, comparing by carrier processing means in the data carrier the biometric sample with the biometric template, and completing a handshake process with the external arrangement as well as performing the application-specific function and transmitting a result of the same to the external arrangement, only if the biometric sample matches the biometric template.

According to a third aspect, the present invention relates to a storage medium comprising a computer program with instructions which are arranged, in execution, to carry out the method above.

The features discussed above in connection with the portable data carrier are, of course, transferable to the method and storage medium according to the second and the third aspect, respectively, of the invention. Moreover the above features can, of course, be combined in the same embodiment.

According to a fourth aspect, the present invention relates to an external arrangement comprising arrangement communication means for contactless receipt and transmission of data, and a sensor for recording a biometric sample. The external arrangement is characterised in that it is arranged to transmit the biometric sample to a portable data carrier, and that it is arranged to complete a handshake process with the portable data carrier as well as receive from the portable data carrier a result of an application-specific function performed in the portable data carrier, only if the biometric sample matches a biometric template stored in the portable data carrier.

The external arrangement can be arranged to receive as said result application-specific information stored in the data carrier.

The external arrangement can be arranged to receive said result in response to an enquiry transmitted to the portable data carrier.

In the case that the biometric template in the carrier storage corresponds to a digital image containing individual-specific information, this should apply to the biometric sample as well.

In the case that the biometric template in the carrier storage defines at least part of a fingerprint, this should apply to the biometric sample as well.

In the case that the biometric template corresponds to feature reference data, the biometric template should correspond to feature data.

In the case that the biometric template corresponds to a combination, the biometric sample should correspond to a corresponding combination of the above alternatives.

The external arrangement can be arranged to transmit a search signal and, in response to the search signal, receive a presence signal from the portable data carrier to detect its presence within a communication range of the external arrangement. In such an embodiment, the external arrangement can be activated for recording by receiving the presence signal, which gives the advantage that a biometric sample cannot be recorded or transmitted without cause, i.e. if no portable data carrier that can receive the biometric sample is available within the communication range of the external arrangement, which results in saving of energy. In an alternative embodiment, the external arrangement is always active.

The external arrangement can be arranged to transmit the biometric sample according to a predetermined schedule until a match is considered to exist. In such an embodiment, a biometric sample can, as soon as it has been recorded, be transmitted to all portable data carriers according to the invention which are positioned within a communication range of the external arrangement. The external arrangement can in this case be completely unaware of the existence of any portable data carriers until a biometric comparison has been performed in a portable data carrier containing a matching biometric template. The above transmission schedule for the biometric sample can be adjusted to the circumstances, i.e. the application in which the external arrangement is intended to be used. The transmission schedule may imply, for instance, that the biometric sample is transmitted at predetermined intervals.

The fact that the external arrangement is arranged according to the above embodiments means that it can function in a satisfactory manner with the different embodiments of the portable data carrier according to the first aspect of the invention to achieve the advantages described above.

According to a fifth aspect, the present invention relates to a method of transferring data by means of an external arrangement, which comprises arrangement communication means for contactless receipt and transmission of data, and a sensor, comprising recording a biometric sample by means of the sensor. The method is characterised in that it further comprises transmitting the biometric sample to a portable data carrier, and completing a handshake process with the portable data carrier as well as receiving from the portable data carrier a result of an application-specific function performed in the portable data carrier, only if the biometric sample matches a biometric template stored in the portable data carrier.

According to a sixth aspect, the present invention relates to a storage medium containing a computer program with instructions which are arranged, in execution, to carry out the method according to the fifth aspect of the invention.

The features discussed above in connection with the external arrangement are, of course, transferable to the method and the storage medium according to the fifth and the sixth aspect, respectively, of the invention. It also goes without saying that the above features can be combined in the same embodiment.

According to a seventh aspect, the present invention relates to a system for transferring data containing a portable data carrier according to the first aspect of the invention and an external arrangement according to the fourth aspect of the invention.

According to an eighth aspect, the present invention relates to a method for transferring data comprising a method according to the second aspect of the invention and a method according to the fifth aspect of the invention.

As stated above, the methods according to the invention can be implemented as computer programs which are stored in a storage and executed in said processing means or in an external device. Alternatively, the methods can wholly or partly be implemented in the form of product-specific circuits, such as ASICs, or in the form of digital or analog circuits or in a suitable combination thereof.

The features discussed above in connection with the portable data carrier and the external arrangement and also the corresponding methods for data transfer by the same, are, of course, transferable to the system and the method, respectively, according to the seventh and the eighth aspect, respectively, of the invention.

The definitions of terms that have been stated above in connection with the description of the first to the third aspect of the present invention are also applicable to the fourth to the eighth aspect of the present invention.

BRIEF DESCRIPTION OF THE DRAWINGS

The invention will now be described in more detail with reference to the accompanying schematic drawings, which illustrate examples of embodiments of the invention.

DESCRIPTION OF PREFERRED EMBODIMENTS

Figure 1:
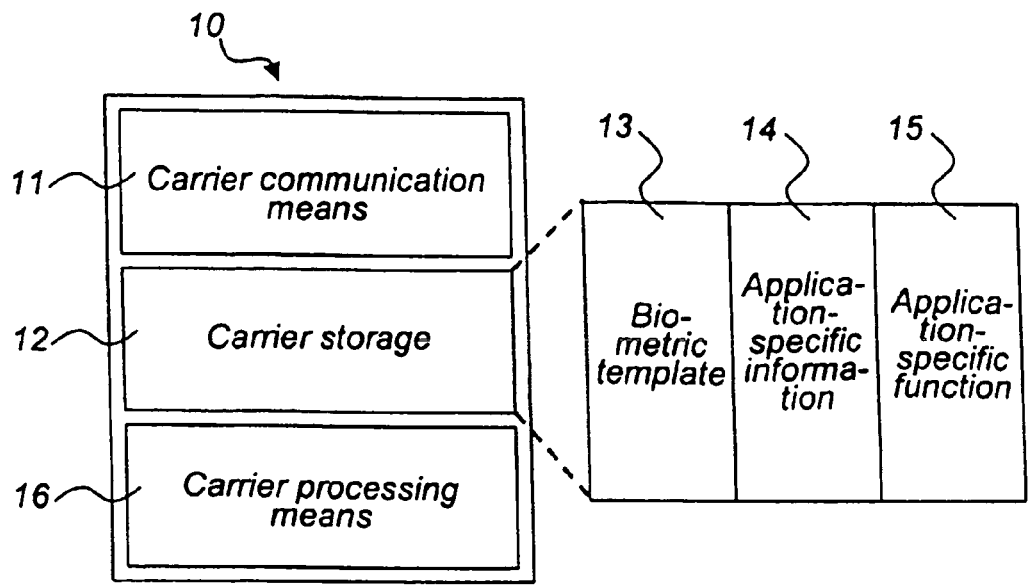
FIG. 1 is a drawing illustrating a portable data carrier according to an embodiment of the invention.
Figure 2:
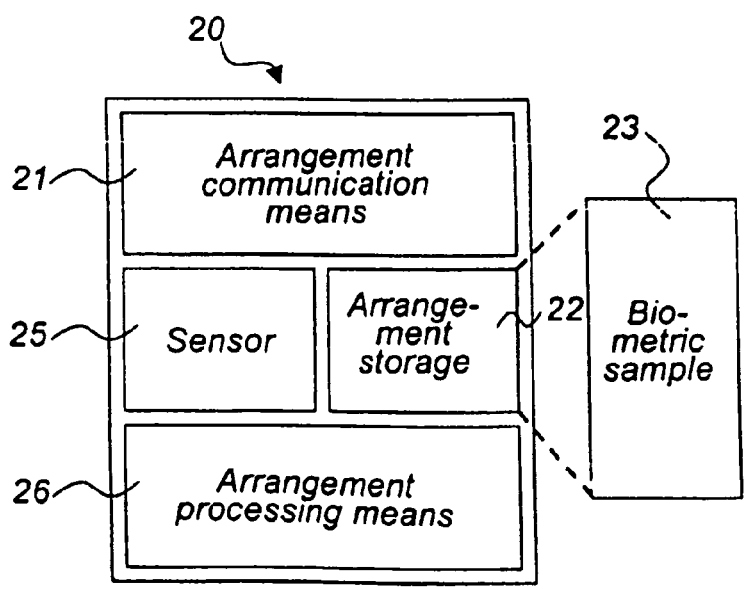
FIG. 2 is a drawing illustrating an external arrangement according to an embodiment of the invention.

FIG. 1 illustrates schematically a portable data carrier 10 in the form of an electronic passport according to the invention. FIG. 2 illustrates schematically an external arrangement 20 according to the invention. The portable data carrier 10 and the external arrangement 20 are included in a system in which they are arranged to communicate with each other in a contactless manner according to known protocols for RF communication, for instance ISO 14443. For this purpose, they comprise carrier communication means 11 and arrangement communication means 21, respectively.

The portable data carrier 10, which has a function that partly reminds of the function of a standard smart card, for instance a Java or MULTOS card, comprises a carrier storage 12 for storing data containing a biometric template 13, application-specific information 14 and an application-specific function 15. Recording and storing of the biometric template 13 can be made in some prior-art manner, for instance in one of the manners described in Applicant's Patent Publications WO01/11577, WO01/84494, WO01/06445 and WO03/003286, which are herewith incorporated by reference. In the present embodiment, the biometric template 13 corresponds to data of a fingerprint from the rightful owner of the electronic passport. As the name indicates, the composition of the application-specific information 14 depends on the context in which the portable data carrier is intended to be used. In the present embodiment, where the portable data carrier is an electronic passport, the application-specific information contains data describing the owner of the portable data carrier, i.e. data that are contained in traditional passports, for instance data indicating the age and nationality of the owner and also information about the authority issuing the passport. The application-specific function 15 contains a set of instructions according to which the portable data carrier is arranged to operate under certain circumstances. As the name indicates, the composition of these instructions depends on the context in which the portable data carrier is intended to be used. In this embodiment, the application-specific function comprises the instruction to retrieve the application-specific information 14 from the carrier storage and transmit it to the external arrangement. This should be done on condition that a biometric match has been established, a handshake has been performed with the external arrangement 20 and an enquiry about information transfer has been received from the external arrangement, as will be explained in more detail below with reference to the description of FIGS. 3 and 4.

Finally, the portable data carrier 10 comprises carrier processing means 16 in the form of a processor using software, which is stored in the carrier storage 12, for processing data in the portable data carrier. The processor performs, for example, the above-mentioned biometric match, handshake and application-specific function.

The external arrangement 20, which in the present embodiment is an external arrangement designed for communication with an electronic passport, i.e. for electronic examination of passports, comprises an arrangement storage 22 for storing data containing a biometric sample 23. Recording and storing of the biometric sample can be performed in some prior-art manner, for instance, in one of the manners described in Applicant's above-mentioned patent publications incorporated herewith. Since the biometric template 13 in the present embodiment corresponds to data of a fingerprint from the rightful holder of the electronic passport 10, the biometric sample 23 corresponds to data of a fingerprint from the individual carrying the electronic passport, which person need not necessarily be the rightful holder.

The external arrangement 20 further comprises a sensor 25 which is arranged to record the biometric sample 23 before this is stored in the arrangement storage 22. In the present embodiment, the sensor 25 is a capacitive sensor which records fingerprints. However also other known types of sensors can be used in connection with the present invention, such as heat sensors or optical sensors. Finally, the external arrangement 20 comprises arrangement processing means 26 in the form of a processor using software, which is stored in the arrangement storage 22, for processing data in the external arrangement. The processor performs, for instance, a handshake with the portable data carrier 10, which will be discussed in more detail below in connection with the description of FIGS. 3 and 4. The communication between the different units included in the portable data carrier and in the external arrangement, respectively, occurs via a data bus (not shown).

Figure 3:
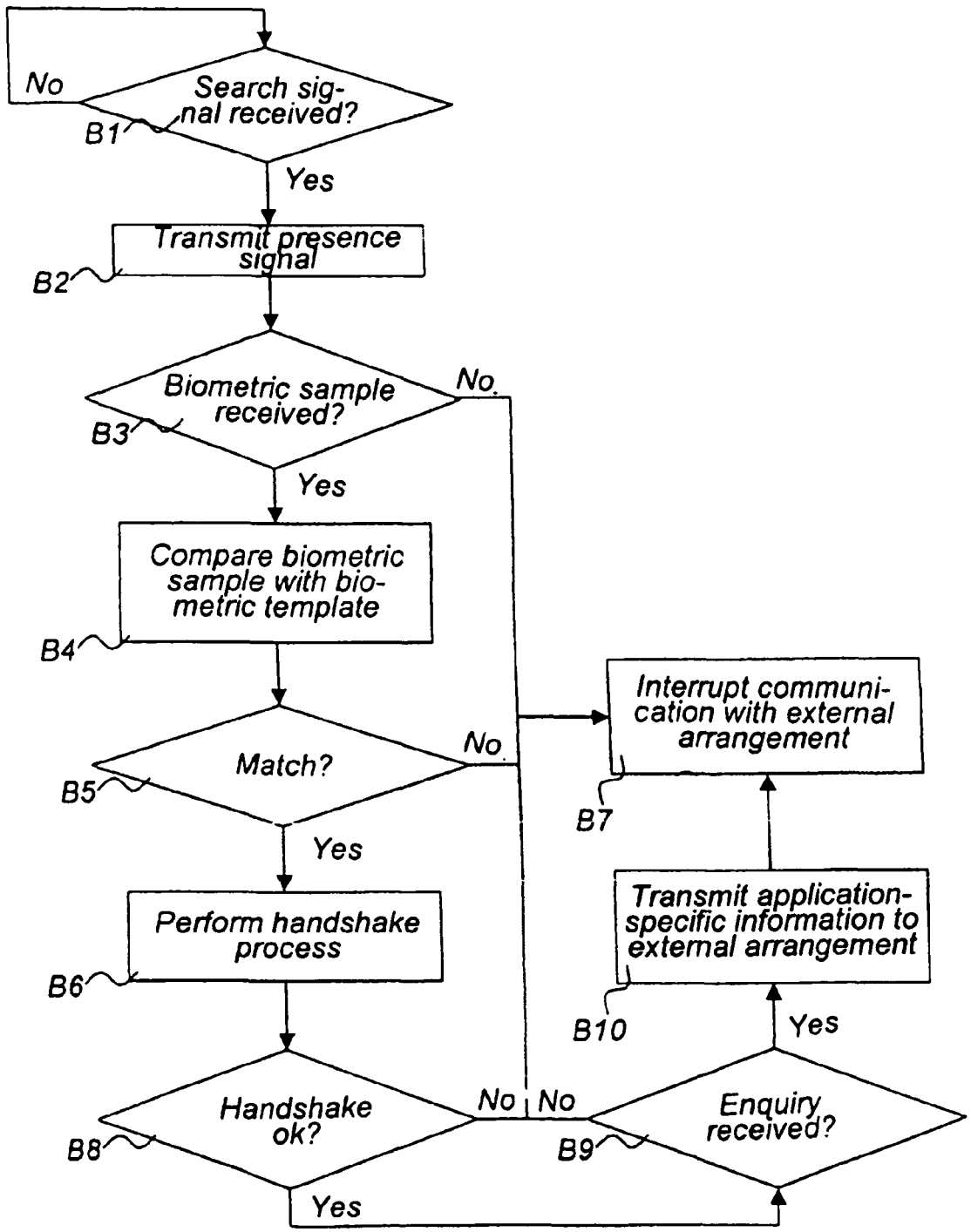
FIG. 3 is a flow chart which shows a method for transferring data by means of a portable data carrier according to an embodiment of the invention.
Figure 4:
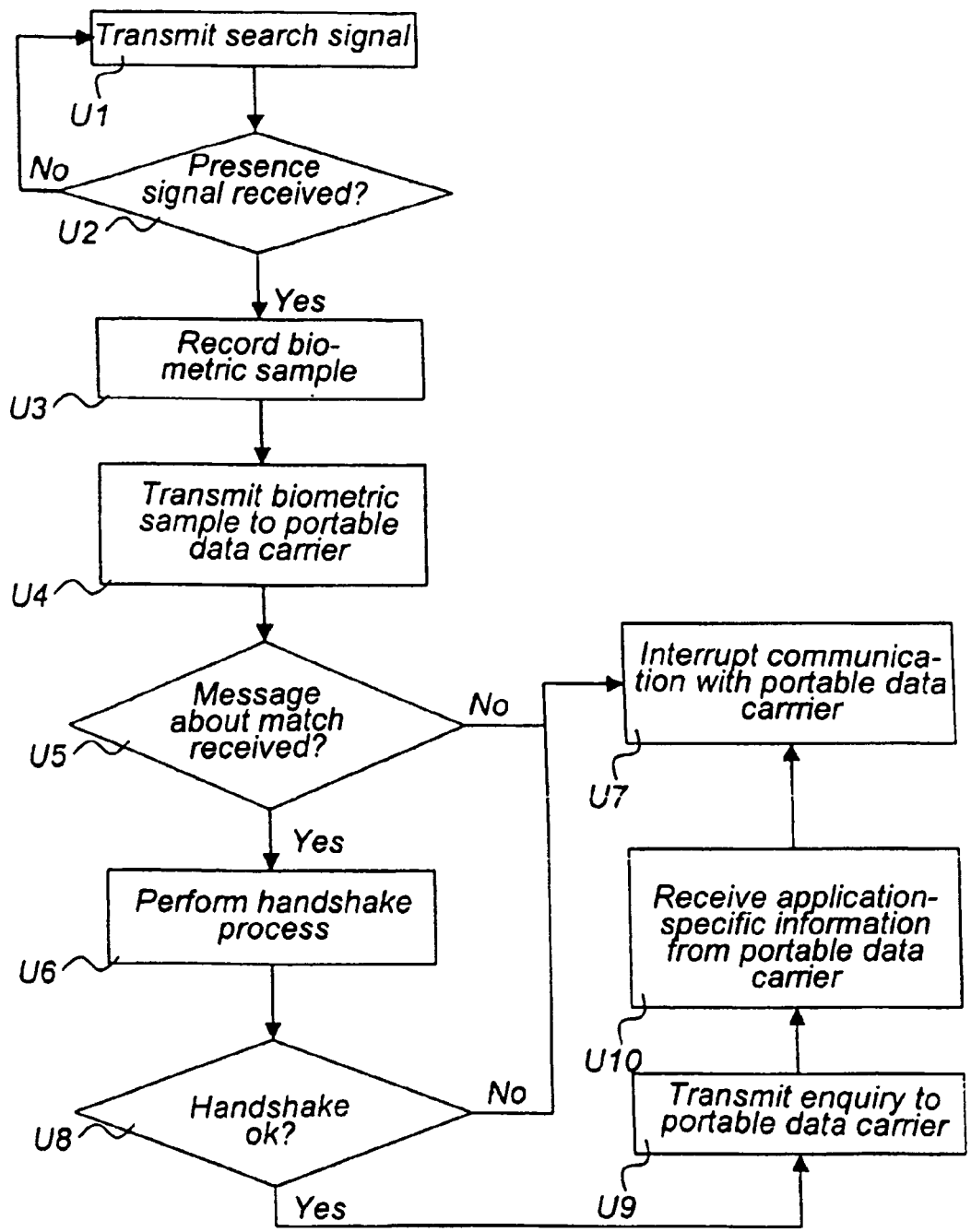
FIG. 4 is a flow chart which shows a method for transferring data by means of an external arrangement according to an embodiment of the invention.

FIGS. 3 and 4 together illustrate a method for transferring data in the system consisting of the portable data carrier 10 according to FIG. 1 and the external arrangement 20 according to FIG. 2. FIG. 3 illustrates the method (steps B1-B10) which is carried out in the portable data carrier, i.e. the electronic passport, in the data transfer, while FIG. 4 illustrates the method (steps U1-U10) which is carried out in the external arrangement in the data transfer.

In the present embodiment, the method for transferring data in the system above is used in order to perform contactless examination of passports. An individual who is to be examined by means of his electronic passport 10 approaches the passport control where an external arrangement 20 is installed. Initially in the method, the external arrangement 20 wirelessly transmits, by said arrangement communication means 21, a search signal (U1) to detect the presence of a portable data carrier within a distance that defines the communication range of the external arrangement. When the individual above, and thus his/her electronic passport 10, comes within the communication range of the external arrangement, this actuates the electronic passport according to a prior-art method by means of an antenna arranged in the electronic passport (not shown), thereby activating the passport for receiving the search signal transmitted by the external arrangement. After actuation of the electronic passport, it checks (B1) whether a search signal is received. If a search signal is received from the external arrangement, the electronic passport 10 transmits by said carrier communication means 11 a presence signal (B2) to confirm its presence within the communication range of the external arrangement. If a search signal is not received, the check is repeated (B1). The repetition proceeds as long as the electronic passport is within the communication range of the external arrangement. As soon as the electronic passport leaves the communication range, its actuation ceases, and the electronic passport "dies". After the external arrangement has transmitted a search signal (U1), it checks (U2) whether a presence signal is received during a predetermined search time after the transmission of the search signal. If a presence signal is not received during this predetermined search time, the external arrangement transmits a new search signal. If, however, a presence signal is received during the predetermined search time, it means that at least one portable data carrier, which possibly is an electronic passport, is positioned nearby.

In the next step, provided that the presence of a portable data carrier has been established, the external arrangement 20 is activated for recording, and the above individual can put his finger on the sensor 25 for recording a biometric sample in one of the prior-art ways stated above (U3). After the external arrangement has recorded the biometric sample, this is transmitted wirelessly by said arrangement communication means 21 to the electronic passport (U4). At the same time the electronic passport checks whether a biometric sample is received (B3) during a predetermined time of reception after the transmission of the presence signal. Of course, this occurs provided that the electronic passport is still within the communication range of the external arrangement. If no biometric sample is received during the predetermined time of reception, the communication with the external arrangement is interrupted (B7). Otherwise the electronic passport 10 compares by said carrier processing means 16 the received biometric sample with the stored biometric template (B4) to establish whether there is a match between them, i.e. to check whether the biometric sample and the biometric template originate from the same individual. In the comparison, a value of the correlation between the biometric sample and the biometric template is calculated, and this correlation value is then weighed against a predetermined threshold value which is stored in the carrier storage 12. If the correlation value exceeds the threshold value, a match is considered to exist. Otherwise no match is considered to exist.

If the match check (B5) gives a positive response, a message about match is transmitted from the electronic passport to the external arrangement. If instead the match check gives a negative response, the communication with the external arrangement is interrupted (B7). During a predetermined time of match after the transfer of the biometric sample, the external arrangement checks whether a message about match is received (U5). If such a message about match is received, a prior-art handshake process (B6, U6) is performed between the electronic passport 10 and the external arrangement 20. If, however, a message about match is not received during the predetermined time of match, the communication between the electronic passport and the external arrangement is interrupted (U7).

In the present embodiment, a three-way handshake is performed according to a prior-art method, for instance "Mutual Three Pass Authentication" which is described in "Philips Mifare", reference ISO/IEC 9798-2. In the present embodiment, the receipt of a message about match, i.e. a positive response in the check (U5) on the arrangement side, means that the electronic passport, within the predetermined time of match after transmission of the biometric sample, initiates the handshake process above. By the electronic passport initiating the handshake, the external arrangement will be informed that a match exists. In an alternative embodiment, the external arrangement can instead be arranged to initiate the handshake process. In that case, the message about match does not result in the initiation of a handshake but only the transmission of a signal indicating that a match exists.

The performing of the handshake process (B6) means that the electronic passport checks whether the external arrangement is of the right "type", i.e. of the type with which the electronic passport is arranged to "fully" communicate. In the same way, the performing of the handshake process (U6) means that the external arrangement checks whether the portable data carrier is of the right "type", i.e. of the type with which the external arrangement is arranged to "fully" communicate. The right type of external arrangement for an electronic passport is an external arrangement intended for examination of passports and vice versa.

A successful outcome of the above handshake process (B6, U6) means that the two checks whether the handshake is OK (B8, U8) give positive responses. An unsuccessful outcome of the above handshake process (B6, U6) means that at least one of the two checks whether the handshake is OK (B8, U8) gives a negative response. In the present embodiment, where the electronic passport initiates the three-way handshake, the response from the handshake check in the electronic passport (B8) must be positive for the handshake check in the external arrangement (U8) to give a positive response. Such a positive response means that the electronic passport and the external arrangement are allowed to fully communicate with each other. The external arrangement then transmits an enquiry (U9) regarding transmission of application-specific information to the electronic passport. At the same time the electronic passport checks whether such an enquiry is received (B9) from the external arrangement within a predetermined time of enquiry after the performing of the handshake process. If this does not occur, the communication with the external arrangement is interrupted (B7). If, however, the enquiry is received within the time of enquiry, the required application-specific information is transferred from the electronic passport to the external arrangement (B10, U10) before the communication is interrupted (B7, U7). In the present embodiment, a negative response from the handshake check in the external arrangement (U8) can mean a positive or a negative response from the handshake check in the electronic passport (B8). In any case, this means that the electronic passport and the external arrangement are not allowed to fully communicate with each other, and the communication between them is interrupted.

When the transfer of the application-specific information from the electronic passport to the external arrangement is completed, a passport official can be allowed to look at the application-specific information by means of a display unit, for instance a computer monitor (not shown). In this context, it may also be possible for the passport official to record new data by inputting means (not shown) in the storage of the electronic passport, for instance data indicating that a country has been visited by the holder of the passport, when the holder arrived in and when he/she left the country, i.e. data which in current passports are recorded by stamps in the passport.

To simplify the description of the embodiment above, only one portable data device has been discussed in connection with an external arrangement. However, this simplified embodiment probably mirrors a realisation of the invention since the communication range of the external arrangements which are currently intended for electronic examination of passports is limited and is within 10-15 cm. Due to such a relatively small range, the communication between an external arrangement and a plurality of portable data carriers at the same time will be quite improbable since it would mean that the holders of the portable data carriers would be jostling with each other in front of the external arrangement. The communication range of an external arrangement as described above could be extended by increasing the transmit power of the communication means. However, this would mean that a radiation level from the external arrangement could increase to a value above the limit value. In any case, a function for anti-collision is implemented in the above embodiment so that an external arrangement can keep a check on which portable data carrier it communicates with if a plurality of portable data carriers are within the communication range of the external arrangement. Moreover, the signals and information transferred in the above embodiment are encrypted. Alternative embodiments where encryption is not used are, of course, conceivable.

For the sake of clarity, it should be pointed out that the steps of the system method for transferring data between an external arrangement and a portable data carrier can only be performed when the portable data carrier is within the communication range of the external arrangement. In the above embodiment, if the electronic passport leaves the communication range of the external arrangement, the system method must be carried out once more from the beginning if and when the electronic passport again comes within the communication range. Thus, all steps of the system method can only be performed if the electronic passport is within the communication range for a continuous time which is long enough for all steps of the system method to be able to be performed.

The above method and construction of the portable data carrier and the external arrangement mean that a check has to be made, indicating that the individual using a portable data carrier actually is the rightful holder of the same before an external arrangement can get to know even the type of the data carrier. Such a check of holder requires, as described above, the user's consent and interaction, thus preventing unauthorised reading of data from the portable data carrier. Moreover reading of personal and possibly delicate information is not allowed without reservation even if the check of holder is positive. Also a "handshake check" is necessary to verify that the external arrangement and the portable data carrier are intended to "fully" communicate with each other before the external arrangement can get access to information in the portable data carrier. Finally, that described above means that the biometric template stored in the portable data carrier does not have to leave the carrier storage since the comparison with the biometric sample occurs in the portable data carrier. More specifically, the portable data carrier in the present embodiment is arranged to prevent access to the biometric template, thus preventing it from being read by external arrangements.

The portable data carrier in the embodiment described above is a passive data carrier in the form of an electronic passport. In an alternative embodiment, the portable data carrier is instead an active data carrier in the form of a mobile phone or a PDA with bank card functionality. The construction of the active data carrier corresponds to the construction of the passive data carrier according to FIG. 1 except that the active data carrier also comprises an energy source for actuation of the components included. The active data carrier and an external arrangement like the one described above according to FIG. 2 are included in a system, in which they are arranged to communicate with each other in a contactless manner according to some prior-art communication technology, such as Bluetooth. Just like in the embodiment above, the biometric template stored in the active data carrier corresponds to data of a fingerprint from the active data carrier's rightful owner. The application-specific function stored in the active data carrier comprises a set of instructions according to which the active data carrier is arranged to work in response to an enquiry received from the external arrangement. In this embodiment, the application-specific function comprises instructions which are suited for a bank card application, such as verifying data received from the external arrangement and signing a money transaction. This is to be done on condition that a biometric match has been established, a handshake has been performed with the external arrangement and an enquiry has been received from the external arrangement. Just like in the embodiment above, the external arrangement is arranged to record by means of a sensor a biometric sample corresponding to data of a fingerprint from the individual carrying the active data carrier.

When a user is doing bank business by means of his active data carrier, a method similar to the one described above with reference to FIGS. 3 and 4 is carried out. The user approaches the external arrangement in which the bank business is to be done, and a search signal and a presence signal are transferred between the active data carrier and the external arrangement. The user puts his finger on the sensor for recording the biometric sample, which is then wirelessly transmitted to the active data carrier. The active data carrier compares the received biometric sample with the biometric template and establishes that there is a match between them. A handshake is then performed, whereby it is verified that the active data carrier and the external arrangement are intended to "fully" communicate with each other. The external arrangement then transmits an enquiry to the active data carrier to verify certain data and then sign the application to which the bank business is related. This signing will be the result that is transferred from the active data carrier to the external arrangement before the communication between them is interrupted. Hence the bank business is completed.

In connection with the embodiment with the passive data carrier as well as the embodiment with the active data carrier, it has been described how the communication link to the external arrangement is automatically interrupted after the result of the application-specific function has been transferred from the data carrier. In the case involving a passive data carrier and an embodiment without such automatic interruption, the communication link is interrupted in any case when the passive data carrier leaves the actuation range of the external arrangement since the actuation of the passive data carrier then ceases. However, this does not occur in a similar embodiment with an active data carrier since this has its own power source. For increased safety against unauthorised reading, the active data carrier can be arranged to check, at regular intervals after the transfer of the result has begun, whether a predetermined time of transfer has elapsed. When the check indicates that the predetermined time of transfer has elapsed, the active data carrier is then arranged to interrupt the communication with the external arrangement.

Although special embodiments of the invention have been described above, it is obvious to a person skilled in the art that many alternatives, modifications and variations are conceivable in the light of the above description. Examples of such alternatives will be discussed below.

In the above embodiment with the passive data carrier, it has been assumed that the communication range of the external arrangement is the same as the range for actuating the passive data carrier. In another embodiment of the invention, the range for actuating the passive data carrier is not the same as the communication range. In yet another embodiment, the passive data carrier is not actuated by means of the external arrangement. Instead its actuation occurs by means of separate units in the surroundings of the external arrangement. Such separate actuating units could be arranged, for instance, in various strategic positions in a space where also the external arrangement is arranged. In such an embodiment, the passive data carrier would be actuated as soon as its carrier enters the space.

According to alternative embodiments to those described above, the steps of transmitting a search signal, checking the receipt of the search signal, transmitting a presence signal and checking the receipt of the presence signal (U1, B1, B2, U2 in the system method according to FIGS. 3 and 4) are excluded. This embodiment means that the external arrangement is arranged to record a biometric sample and transmit this according to a predetermined schedule, for instance at predetermined intervals, until a match with a portable data carrier is considered to exist. Moreover this embodiment means that the portable data carrier, without revealing its presence within a communication range of the external arrangement, is arranged to receive the biometric sample and make a comparison with the biometric template stored in the carrier storage. In this case, the portable carrier is thus arranged to prevent all transmission of data from the same until a match with a biometric sample is considered to exist. This embodiment means that the biometric sample recorded by the external arrangement is transmitted to all portable data carriers within the communication range of the external arrangement, but that only the portable data carrier which has a stored biometric template matching the biometric sample reveals its presence to the external arrangement. This embodiment thus makes it possible to keep secret the mere ownership of a portable data carrier according to the invention, if the owner so wishes.

In the embodiments above, the construction is such that the communication between the portable data carrier and the external arrangement is interrupted and must be reinitiated if the data carrier for some reason leaves the communication range for a short while. According to an alternative embodiment, a possibility of resuming communication is provided, which means that the communication can be resumed from the "point" where it was interrupted unless the data carrier leaves the communication range for a period exceeding a predetermined maximum period.

In the embodiments above, the handshake process between the portable data carrier and the external arrangement is performed after a biometric match has been established. According to alternative embodiments, this handshake process can instead be performed before the biometric match.

In the embodiments above, the portable data carrier is arranged to perform the application-specific function and transmit a result of the same to the external arrangement on the conditions that a biometric match has been established, a handshake has been performed and an enquiry has been received. Alternative embodiments are conceivable, in which further conditions must be satisfied to perform the application-specific function and transfer the result. In one embodiment, for instance a supplementary identity check is performed after a biometric match has been established by the comparison in the portable data carrier. This supplementary check can be made either in the portable data carrier or in the external arrangement and, for instance, comprise the verification of a secret code or the performing of another biometric match.

The invention is intended to comprise all possible alternatives, modifications and variations of the above embodiments which are within the scope of the appended claims.

The invention claimed is:

1. A portable data carrier, comprising:
 a carrier storage for storing data containing a biometric template and an application-specific function;
 carrier communication means for contactless receipt and transmission of data; and
 carrier processing means for comparing the biometric template with a biometric sample received from an external arrangement, and arranged to complete a handshake process with the external arrangement as well as perform the application-specific function and transmit a result of the same to the external arrangement, only if the biometric sample matches the biometric template.

2. A portable data carrier as claimed in claim 1, wherein the application-specific function comprises retrieving application-specific information stored in the carrier storage, said result containing the application-specific information.

3. A portable data carrier as claimed in claim 1, wherein the application-specific function comprises executing program code stored in the carrier storage.

4. A portable data carrier as claimed in claim 1, arranged to perform the application-specific function and transmit said result of the same to the external arrangement in response to an enquiry received from the external arrangement.

5. A portable data carrier as claimed in claim 1, wherein the biometric template corresponds to a digital image containing individual-specific information.

6. A portable data carrier as claimed in claim 1, wherein the biometric template defines at least part of a fingerprint.

7. A portable data carrier as claimed in claim 1, wherein the biometric template corresponds to feature reference data.

8. A portable data carrier as claimed in claim 1, arranged to store in the carrier storage a threshold value which defines to what degree the biometric sample should correspond to the biometric template for a match to be considered to exist.

9. A portable data carrier as claimed in claim 1, wherein the data carrier is a smart card.

10. A portable data carrier as claimed in claim 1, wherein the data carrier is an electronic passport.

11. A portable data carrier as claimed in claim 1, wherein the data carrier is a mobile phone.

12. A portable data carrier as claimed in claim 1, wherein the data carrier is a PDA (Personal Digital Assistant).

13. A portable data carrier as claimed in claim 1, arranged to prevent the external arrangement from accessing the biometric template.

14. A portable data carrier as claimed in claim 1, arranged to communicate with the external arrangement only for a predetermined time after the match has been considered to exist.

15. A portable data carrier as claimed in claim 1, arranged to transmit a presence signal in response to a search signal received from the external arrangement to confirm its presence within a communication range of the external arrangement.

16. A portable data carrier as claimed in claim 1, arranged to prevent all transmission of data from the same until a match is considered to exist.

17. A method of transferring data by means of a portable data carrier which comprises a carrier storage for storing data containing a biometric template and an application-specific function as well as carrier communication means for contactless receipt and transmission of data, the method comprising:
 receiving a biometric sample from an external arrangement,
 comparing the biometric sample with the biometric template with a carrier processing means in the data carrier, and
 completing a handshake process with the external arrangement as well as performing the application-specific function and transmitting a result of the same to the external arrangement, only if the biometric sample matches the biometric template.

18. A method as claimed in claim 17, wherein performing the application-specific function comprises retrieving application-specific information stored in the carrier storage, said result containing the application-specific information.

19. A method as claimed in claim 17, wherein performing the application-specific function comprises executing program code stored in the carrier storage.

20. A method as claimed in claim 17, comprising performing the application-specific function and transmitting said result of the same to the external arrangement in response to an enquiry received from the external arrangement.

21. A method as claimed in claim 17, wherein the biometric template corresponds to a digital image containing individual-specific information.

22. A method as claimed in claim 17, wherein the biometric template defines at least part of a fingerprint.

23. A method as claimed in claim 17, wherein the biometric template corresponds to feature reference data.

24. A method as claimed in claim 17, further comprising evaluating a result of the comparison against a threshold value which is stored in the carrier storage and which defines to what degree the biometric sample should correspond to the biometric template for a match to be considered to exist.

25. A method as claimed in claim 17, wherein the data carrier is a smart card.

26. A method as claimed in claim 17, wherein the data carrier is an electronic passport.

27. A method as claimed in claim 17, wherein the data carrier is a mobile phone.

28. A method as claimed in claim 17, wherein the data carrier is a PDA (Personal Digital Assistant).

29. A method as claimed in claim 17, further comprising preventing communication with the external arrangement when a predetermined time, after a match has been considered to exist, has elapsed.

30. A method as claimed in claim 17, further comprising receiving a search signal from the external arrangement and, in response to the search signal, transmitting a presence signal to confirm its presence within a communication range of the external arrangement.

31. A method as claimed in claim 17, further comprising preventing all transmission of data from the portable data carrier until a match is considered to exist.

32. A non-transitory computer readable storage medium comprising a computer program with instructions which are arranged, in execution, to carry out the method as claimed in claim 17.

33. An external arrangement comprising:
arrangement communication means for contactless receipt and transmission of data; and
a sensor for recording a biometric sample, wherein the arrangement means is arranged to transmit the biometric sample to a portable data carrier, and arranged to complete a handshake process with the portable data carrier and receive from the portable data carrier a result of an application-specific function performed in the portable data carrier, only if the biometric sample matches a biometric template stored in the portable data carrier.

34. An external arrangement as claimed in claim 33, further arranged to receive as said result application-specific information stored in the data carrier.

35. An external arrangement as claimed in claim 33, further arranged to transmit an enquiry to the portable data carrier and receive said result in response to said enquiry.

36. An external arrangement as claimed in claim 33, wherein the biometric sample corresponds to a digital image containing individual-specific information.

37. An external arrangement as claimed in claim 33, wherein the biometric sample defines at least part of a fingerprint.

38. An external arrangement as claimed in claim 33, wherein the biometric sample corresponds to feature data.

39. An external arrangement as claimed in claim 33, further arranged to transmit a search signal and, in response to the search signal, receive a presence signal from the portable data carrier to detect its presence within a communication range of the external arrangement.

40. An external arrangement as claimed in claim 33, further arranged to transmit the biometric sample according to a predetermined schedule until a match is considered to exist.

41. A method of transferring data by means of an external arrangement which comprises arrangement communication means for contactless receipt and transmission of data, and a sensor, comprising recording a biometric sample by means of the sensor, the method comprising:
transmitting the biometric sample to a portable data carrier, and
completing a handshake process with the portable data carrier and receiving from the portable data carrier a result of an application-specific function performed in the portable data carrier, only if the biometric sample matches a biometric template stored in the portable data carrier.

42. A method as claimed in claim 41, comprising receiving as said result application-specific information stored in the data carrier.

43. A method as claimed in claim 41, further comprising transmitting an enquiry to the portable data carrier and receiving said result in response to said enquiry.

44. A method as claimed in claim 41, further comprising transmitting a search signal and, in response to the search signal, receiving a presence signal from the portable data carrier to detect its presence within a communication range of the external arrangement.

45. A method as claimed in claim 41, further comprising transmitting the biometric sample according to a predetermined schedule until a match is considered to exist.

46. A non-transitory computer readable storage medium comprising a computer program with instructions which are arranged in execution to carry out the method as claimed in claim 41.

47. A system for transferring data, comprising
a portable data carrier, which comprises a carrier storage for storing data containing a biometric template and an application-specific function as well as carrier communication means for contactless receipt and transmission of data; and
an external arrangement comprising arrangement communication means for contactless receipt and transmission of data, and a sensor for recording a biometric sample,
wherein the external arrangement is arranged to transmit the biometric sample to the portable data carrier,
the portable data carrier further comprises carrier processing means for comparing the biometric template with the biometric sample received from the external arrangement, and
the portable data carrier and the external arrangement are arranged to complete a mutual handshake process, the portable data carrier is arranged to perform the application-specific function and transmit a result of the same to the external arrangement, and the external arrangement is arranged to receive the result from the portable data carrier, only if the biometric sample matches the biometric template.

48. A method of transferring data between
a portable data carrier which comprises a carrier storage for storing data containing a biometric template and an application-specific function, as well as carrier communication means for contactless receipt and transmission of data, and
an external arrangement which comprises arrangement communication means for contactless receipt and transmission of data, and a sensor, the method comprising:
recording a biometric sample by means of the sensor;
transmitting from the external arrangement the biometric sample to the portable data carrier;

receiving in the portable data carrier the biometric sample from the external arrangement;
comparing by carrier processing means in the data carrier the biometric sample with the biometric template; and
completing a handshake process between the portable data carrier and the external arrangement, performing in the portable data carrier the application-specific function and transmitting a result of the same to the external arrangement, as well as receiving in the external arrangement the result from the portable data carrier, only if the biometric sample matches the biometric template.

* * * * *